(12) United States Patent
Bueno De Santiago

(10) Patent No.: US 10,156,223 B2
(45) Date of Patent: Dec. 18, 2018

(54) HOISTING SYSTEMS AND METHODS

(71) Applicant: ALSTOM Renewable Technologies Wind B.V., Breda (NL)

(72) Inventor: Adrian Bueno De Santiago, Barcelona (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 397 days.

(21) Appl. No.: 15/072,410

(22) Filed: Mar. 17, 2016

(65) Prior Publication Data
US 2016/0273515 A1    Sep. 22, 2016

(30) Foreign Application Priority Data

Mar. 19, 2015 (EP) .................. 15382130

(51) Int. Cl.
*F03D 1/00* (2006.01)
*B66C 23/18* (2006.01)
(Continued)

(52) U.S. Cl.
CPC .............. *F03D 1/005* (2013.01); *B66C 1/62* (2013.01); *B66C 23/185* (2013.01); *F03D 13/10* (2016.05);
(Continued)

(58) Field of Classification Search
CPC ............ F03D 1/005; F03D 1/108; F03D 1/00; F03D 13/10; F03D 13/40; B66C 1/62;
(Continued)

(56) References Cited

U.S. PATENT DOCUMENTS

2003/0183594 A1* 10/2003 Torres Martinez ... B66C 23/207
212/196
2007/0266538 A1* 11/2007 Bervang ............... F03D 1/0658
29/428
(Continued)

FOREIGN PATENT DOCUMENTS

EP       2 128 431 A2    12/2009
WO   WO 2009/041812 A1    4/2009
WO   WO 2009/068038 A1    6/2009

OTHER PUBLICATIONS

EP Search Report, dated Aug. 26, 2015.

*Primary Examiner* — Michael E Gallion
(74) *Attorney, Agent, or Firm* — Dority & Manning, P.A.

(57) ABSTRACT

Hoisting systems are provided for mounting a hub on top of a tower, the hub carrying a first and a second blade forming a bunny ears configuration, and a third blade. The system comprises a crane for pulling up the hub to the top of the tower, and a blade support for supporting the third blade at a supported blade portion. The system further comprises a hub-blade coupling device configured to assist in coupling a root portion of the third blade to a coupling portion of the hub. The hub-blade coupling device comprises a hub mount structure configured to be removably fixed to the hub, a blade mount structure configured to be removably fixed to the third blade, and a connector rotatably coupling the hub mount structure and the blade mount structure. Methods are provided of mounting a hub on top of a tower by using any of said systems.

15 Claims, 9 Drawing Sheets

(51) Int. Cl.
  *B66C 1/62* (2006.01)
  *F03D 13/10* (2016.01)
  *F03D 13/40* (2016.01)
(52) U.S. Cl.
  CPC ...... *F03D 13/40* (2016.05); *F05B 2230/6102* (2013.01); *F05B 2240/95* (2013.01); *Y02E 10/727* (2013.01); *Y02P 70/523* (2015.11)
(58) Field of Classification Search
  CPC ..... B66C 23/207; B66C 23/185; Y02E 10/72; Y02E 10/721; Y02E 10/726; Y02E 10/727; Y02E 10/728; Y02P 70/523; F05B 2230/6102; F05B 2240/95
  See application file for complete search history.

(56) References Cited

U.S. PATENT DOCUMENTS

| | | | |
|---|---|---|---|
| 2008/0216301 A1* | 9/2008 | Hansen | B66C 1/108 29/428 |
| 2009/0199377 A1* | 8/2009 | Deese | F03D 1/003 29/23.51 |
| 2009/0282776 A1* | 11/2009 | Berg | E02B 17/0818 52/745.04 |
| 2010/0139062 A1* | 6/2010 | Reed | F03D 13/10 29/23.51 |
| 2010/0236161 A1* | 9/2010 | Livingston | F03D 13/10 52/125.2 |
| 2013/0223964 A1* | 8/2013 | Zheng | E04H 12/34 414/560 |
| 2013/0318789 A1* | 12/2013 | Gabeiras | B21K 3/04 29/889.7 |
| 2015/0232307 A1* | 8/2015 | Holloway | B66C 1/108 414/800 |
| 2015/0233341 A1* | 8/2015 | Neumann | F03D 1/001 414/800 |
| 2015/0368075 A1* | 12/2015 | Clymans | B66C 23/185 212/273 |
| 2016/0069321 A1* | 3/2016 | Neumann | B66D 1/60 414/800 |
| 2018/0195497 A1* | 7/2018 | Neumann | F03D 13/10 |

* cited by examiner

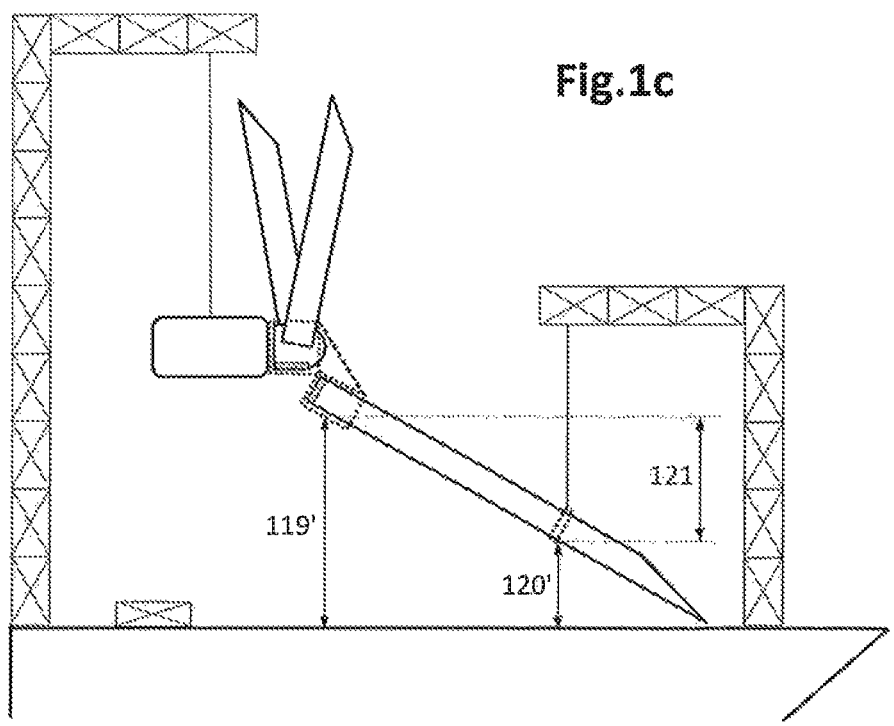

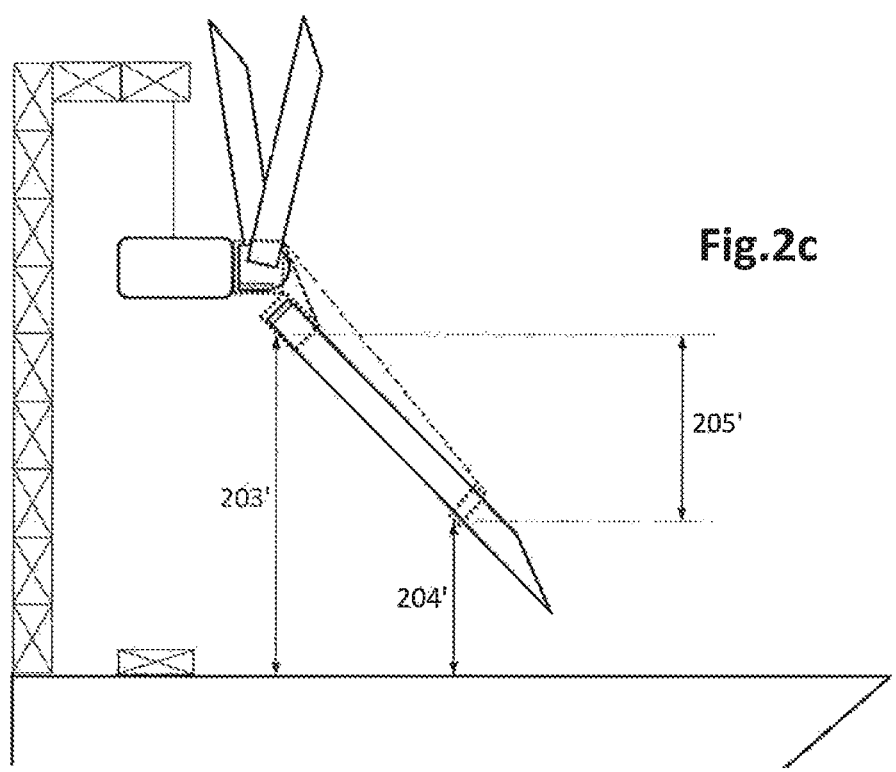

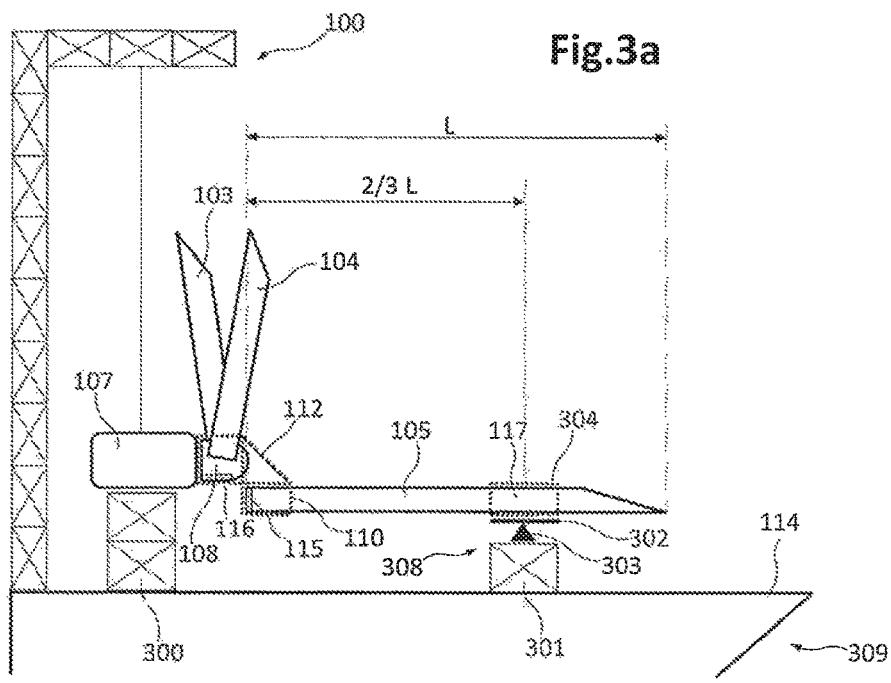
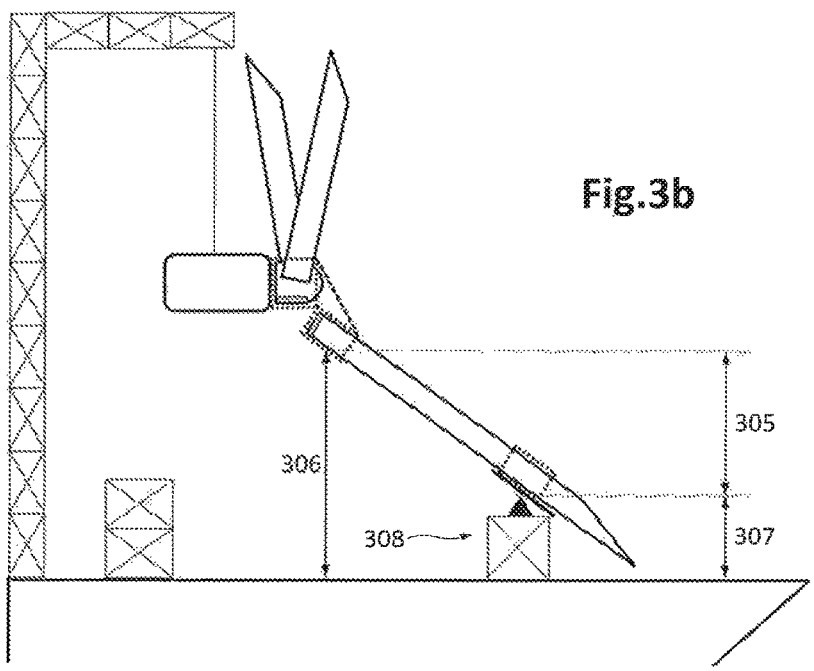

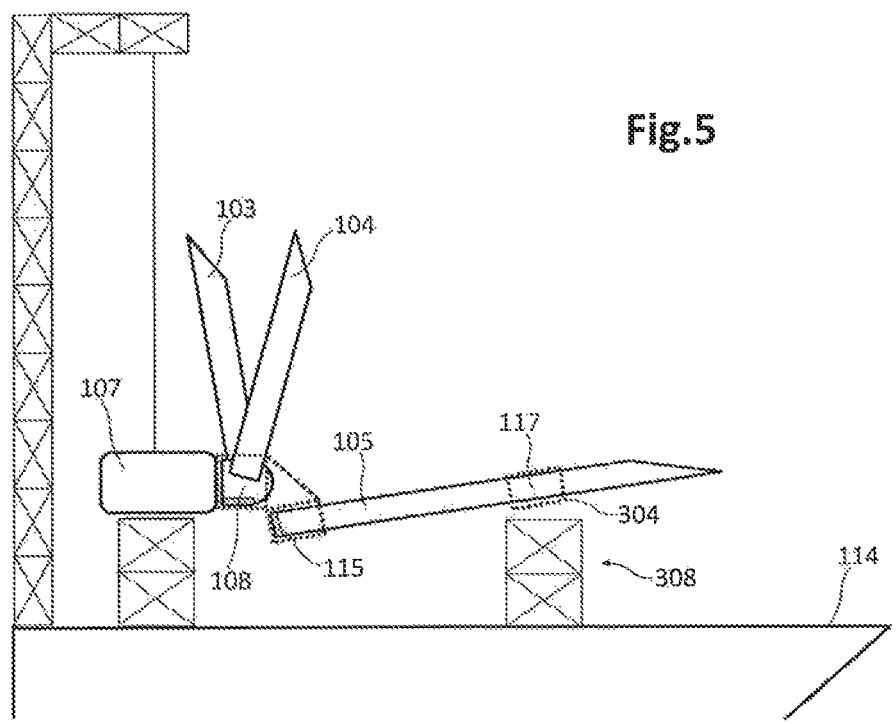

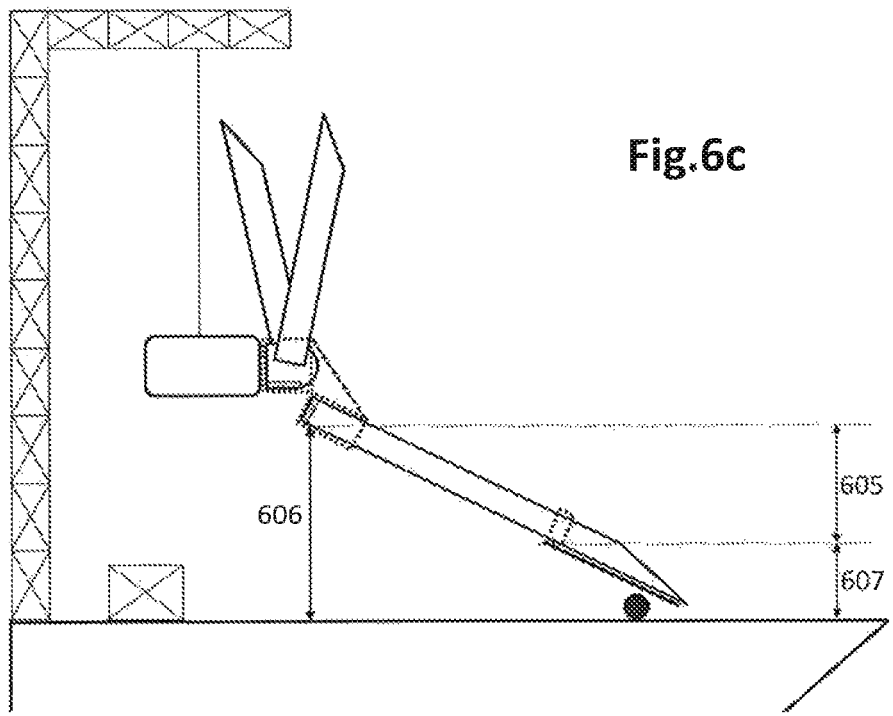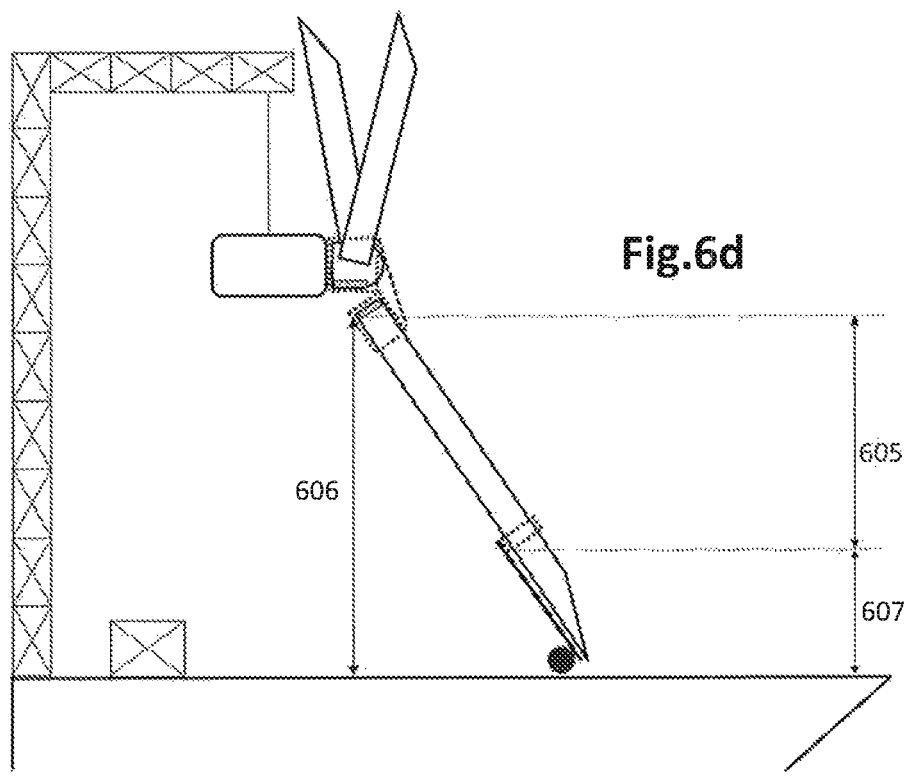

HOISTING SYSTEMS AND METHODS

The present disclosure relates to hoisting systems configured to mount a hub on top of a tower to form a wind turbine, and to methods of mounting a hub on top of a tower to form a wind turbine.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of a rotor shaft drives a generator rotor either directly ("directly driven") or through the use of a gearbox. The gearbox (if present), the generator and other systems are usually mounted in a nacelle on top of a wind turbine tower.

When wind turbines are erected, the tower is generally constructed first and placed upon a foundation. Then the nacelle, typically containing the generator and the gearbox (if present), is usually mounted on top of the tower. Then, the hub may be hoisted and mounted. Finally, the blades are hoisted one by one from a ground level towards the rotor hub and mounted therein. In an alternative method, one or more blades may be pre-assembled with the hub when lifting the hub. Depending on the wind turbine configuration, the combination of nacelle and hub may be hoisted to the top of the tower, after which the blades are mounted to the hub.

The blades may be installed in a variety of ways, e.g. in a substantially vertical manner or substantially horizontally or at other inclined angles. Particularly, in offshore wind turbines, mounting a blade from above the hub may be very complicated, or at least require an very large, high capacity crane and jack-up barge. Such an installation method may thus be very expensive and depending on the depth of the sea may simply be impossible.

It is known to hoist a complete rotor assembly, i.e. the hub with blades, and mount it to e.g. the nacelle. But in order to mount a complete rotor assembly, a large surface area is required, which is typically not available in the case of offshore wind turbines.

It is further known to hoist and mount an incomplete rotor assembly on the nacelle, e.g. the hub with two blades and subsequently, hoisting and mounting the remaining blade. In these cases, the rotor with the two blades is normally mounted with the two blades pointing upwards, i.e. "bunny ears" configuration. There is thus no need for rotating the wind turbine rotor as the third blade could be vertically mounted from below.

However, in order to be able to perform these rather complicated and time consuming installation steps, the prevailing wind speed has to be below a predetermined value. The period of time depends on the expected length of the installation operation and a safety factor to be taken into account.

During certain seasons, windows of several hours in which the wind does not reach the predetermined maximum wind speed may not be available very often. In practice, this may mean that personnel and maintenance equipment, including e.g. expensive cranes and jack-up barges, may be in stand-by during days or even weeks. This may represent an enormous cost.

It is known to mount each of the plurality of blades substantially horizontally or substantially vertically. This means that individual installation steps may require less time and may be performed at higher winds, thus increasing the time windows available for installation. However, such methods require rotation of the hub between the mounting of one blade and another. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub.

Application of a very high torque may therefore be necessary for rotating the hub.

The torque may be delivered by using the gearbox (when present) with an external power supply for rotating the rotor. Such a system may be used in combination with a locking pin for maintaining the rotor in a desired position for installation. This is not possible in case of directly driven wind turbines as no gearbox is provided between rotor and generator. Even though the generator may be suitable for being operated as a motor, it will generally not be able to deliver the required torque to rotate the hub when the hub is unbalanced, i.e. when at least one but not all the blades have been mounted.

It is an object of the present disclosure to provide systems and methods that at least partially reduce one or more of the aforementioned drawbacks, leading to improved methods of mounting a hub on top of a tower especially suitable for direct drive offshore wind turbines.

SUMMARY

In a first aspect, a hoisting system is provided for mounting a hub on top of a tower to form a wind turbine, the hub carrying a first blade and a second blade forming a bunny ears configuration and a third blade. The hoisting system comprises a first crane, a blade support, and a hub-blade coupling device. The first crane is configured to pull up the hub from a ground level to the top of the tower.

The hub may be initially attached to a nacelle (at ground level), in which case the first crane may be understood as being configured to pull up both the nacelle and hub as a single body to the top of the tower. The hub may alternatively not be initially attached to a nacelle (at ground level), in which case the first crane may be understood as being configured to pull up only the hub for its coupling with a nacelle that may have been previously mounted on top of the tower.

The blade support is configured to support the third blade at a supported blade portion. The hub-blade coupling device is configured to assist in coupling a root portion of the third blade to a coupling portion of the hub.

The hub-blade coupling device comprises a hub mount structure, a blade mount structure, and a connector rotatably coupling said structures. The hub mount structure is configured to be removably fixed to the hub. The blade mount structure is configured to be removably fixed to the third blade at or near the root portion of the third blade. The connector may comprise e.g. a hinge. In alternative examples, a nacelle mount structure configured to be removably fixed to the nacelle may be used instead of the hub mount structure with same or similar effects.

The blade support may be either comprised in the hub-blade (or nacelle-blade) coupling device or external to the hub-blade (or nacelle-blade) coupling device.

The first crane and the blade support may be configured to cooperate for causing an additional movement of the third blade during at least part of or after the pulling up of the hub. This additional movement may be such that an increasing difference between height of the root portion and height of the supported blade portion is caused, so that the blade mount structure rotates with respect to the hub mount structure. Said rotation may be such that the third blade moves towards a substantially vertical position, in which the root portion of the third blade and the coupling portion of the hub (e.g. a mounting flange) are facing each other.

Once the third blade is in the vertical position, it may be pulled up in such a way that its root portion is coupled with the coupling portion of the hub. The pulling up of the third blade may be performed by using a lift system based on e.g. hydraulic pistons, which may be comprised in the blade mount structure or the hub mount structure. Alternatively, this lift system may be external to the hoisting system.

Once coupled, the root portion of the third blade may be fixed to the coupling portion of the hub by using suitable fastening means, such as e.g. screws, bolts, etc.

With the proposed hoisting system, mounting a complete hub (with all the blades) on top of a tower may be performed with a single hoisting step, thereby reducing the time of the mounting operation. Hence, depending on the circumstances, shorter time periods of prevailing wind speed below a predetermined value may be required in comparison with prior art approaches based on e.g. multiple hoisting steps.

Moreover, since the third blade is pulled up without being installed on the hub, a smaller surface area may be required on the ground or deck level to form the hub structure to be hoisted (constituted by e.g. nacelle, hub, blades, hub-blade coupling device, etc.). The hub structure (to be hoisted) may be initially formed, for example, with the third blade lying on deck level in offshore applications and with the other two blades erected forming the "bunny ears" configuration.

According to examples, the blade support may comprise a cable-based support system such as e.g. a second crane or a tensor system. The second crane may be configured to hold up the third blade at the supported blade portion at a height such that, in use, cooperation of the first and the second crane may cause the aforementioned additional movement of the third blade (towards vertical position) during at least part of the pulling up of the hub.

The tensor system may comprise a cable and a cable regulator. The cable may connect the hub mount structure with the supported blade portion of the third blade in a tensed manner, such that the third blade is held up by the tensed cable. The cable regulator may be configured to extend the tensed cable and, therefore, causing lowering of the third blade at the supported blade portion during at least part or after the pulling up of the hub. This lowering (by the tensor system) along with the pulling up of the hub (by the first crane) may cause the pursued additional movement of the third blade towards vertical position.

In any example wherein the hoisting system comprises the second crane and/or the tensor system, the hoisting system may further comprise a sling. Said sling may be configured to hold the supported blade portion of the third blade and to be attached to an end of the cable in such a way that, in use, the third blade is held up by the cable at the supported blade portion with the cable attached to the sling.

Alternatively or in addition to having the second crane or the tensor system, the blade support may comprise a pivoting support system. This pivoting support system may comprise a support base configured to cause pivoting of the third blade at the supported blade portion on the support base during at least part of the pulling up of the hub. This pivoting may be such that the target additional movement of the third blade towards vertical position is caused. In some configurations, cable-based support system and pivoting support system may co-exist and cooperate in causing the target additional movement of the third blade (towards vertical position).

According to examples, the pivoting support system may further comprise a support platform pivotally arranged on the support base, such that joint pivoting of the third blade at the supported blade portion and the support platform is caused during at least part of the pulling up of the hub. This joint pivoting of the blade and the support platform may be such that the target additional movement of the third blade (towards vertical position) is caused.

An aspect of having such a support platform may be that the third blade is supported in a more reliable/equilibrated manner at the supported blade portion by the blade support.

In any of the pivoting support systems described before, the blade support may be sized in such a way that, when the hub is initially at the ground/deck level, the supported blade portion of the third blade is in a position more elevated than the root portion of the third blade.

An aspect hereof is that the hub structure to be hoisted (constituted by e.g. nacelle, hub, blades, hub-blade coupling device, etc.) may occupy less deck/ground space. Therefore, larger amounts of hub structures (to be hoisted) may be arranged on the ground/deck. In the case of offshore wind turbines, it may be especially advantageous because larger amounts of hub structures (to be hoisted) may be transported on a same vessel to corresponding offshore locations.

Another aspect of initially having the supported blade portion more elevated than the root portion of the third blade is that, when the third blade is arranged overhanging the deck, negative effects of the surf on the third blade may be avoided or attenuated, and transportation restrictions may be reduced or avoided.

BRIEF DESCRIPTION OF THE DRAWINGS

Non-limiting examples of the present disclosure will be described in the following, with reference to the appended drawings, in which:

FIGS. 1a-1c schematically illustrate a hoisting system and a method of mounting a hub on top of a tower by using said hoisting system, according to an example.

FIGS. 2a-2c schematically illustrate a hoisting system and a method of mounting a hub on top of a tower by using said hoisting system, according to a further example.

FIGS. 3a-3b schematically illustrate a hoisting system and a method of mounting a hub on top of a tower by using said hoisting system, according to a still further example.

FIG. 5 schematically illustrates a hoisting system for mounting a hub on top of a tower, according to a yet further example.

FIGS. 6a-6d schematically illustrate a hoisting system and a method of mounting a hub on top of a tower by using said hoisting system, according to an additional example.

DETAILED DESCRIPTION OF EXAMPLES

Figure 1A:
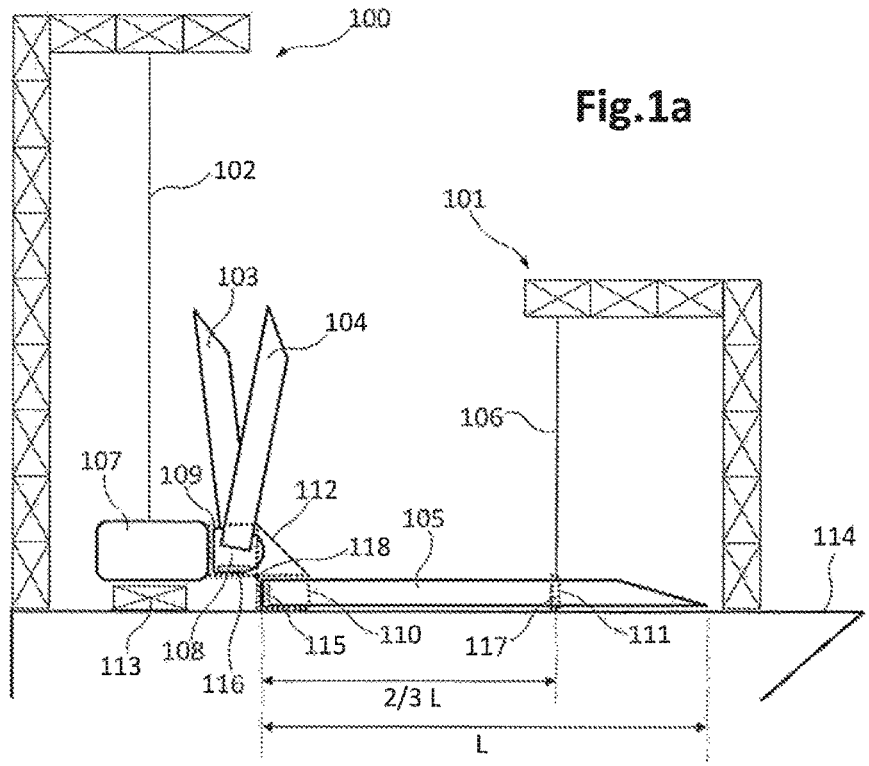
Figure 1B:
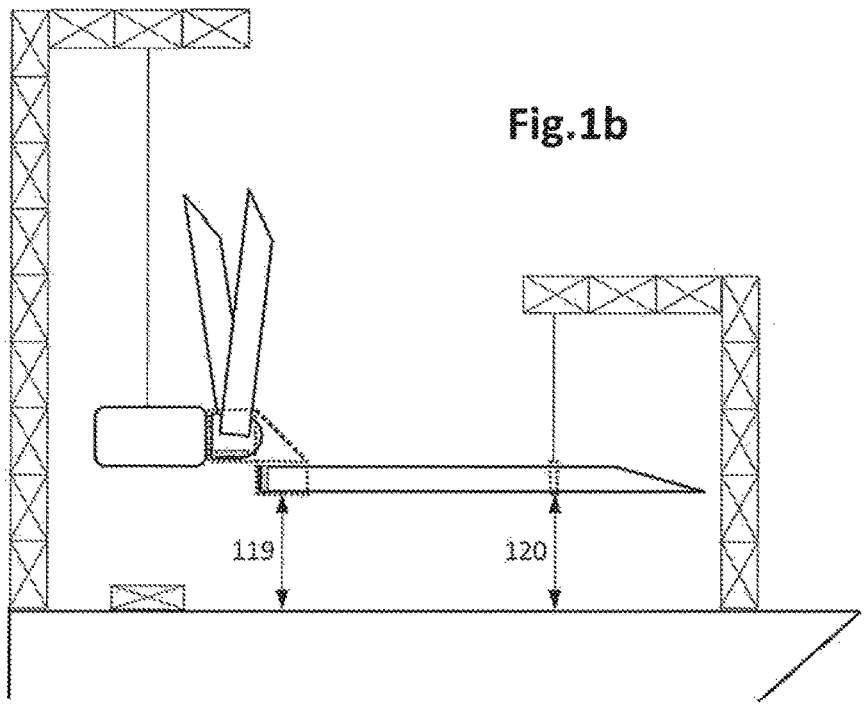

FIGS. 1a-1c show a hoisting system configured to mount a nacelle 107 and hub 108 on top of a tower to form a wind turbine, according to an example. The hub 108 is shown carrying a first blade 103 and a second blade 104 forming a bunny ears configuration, and a third blade 105. The hoisting system may comprise a first crane 100 with a cable 102 for pulling up the nacelle 107 and hub 108 from a ground level 114 to the top of the tower. In the case of offshore wind turbines, the ground level may be a deck level 114 of a vessel for transporting wind turbine parts to corresponding offshore locations.

The hoisting system may further comprise a blade support and a hub-blade coupling device. The blade support may comprise a second (or auxiliary) crane 101. The hub-blade coupling device may be configured to assist in coupling a root portion 115 of the third blade 105 to a coupling portion 116 of the hub 108. The hub-blade coupling device may comprise a hub mount structure 109, a blade mount structure 110, and a hinge 118.

The hub mount structure 109 may be configured to be removably fixed to the hub 108. The blade mount structure 110 may be configured to be removably fixed to the third blade 105 at or near the root portion 115 of the third blade 105. The hinge 118 may be configured to rotatably connect or couple the hub mount structure 109 and the blade mount structure 110.

The second crane 101 may have a cable 106 configured to hold up the third blade 105 at a blade portion 117 through e.g. a sling 111. The first crane 100 and the second crane 101 may cooperate in such a way that an additional movement of the third blade 105 is caused during at least part of or after the pulling up of the nacelle 107 and hub 108. Said additional movement of the third blade 105 may be such that a difference 121 between height 119' of the root portion 115 and height 120' of the blade portion 117 held by the sling 111 is increased (see FIG. 1c). Said additional movement of the third blade 105 may therefore cause rotation of the blade mount structure 110 around the hinge 118, i.e. with respect to the hub mount structure 109. And said rotation may cause the third blade 105 to move towards a substantially vertical position in which the root portion 115 of the third blade 105 and the coupling portion 116 of the hub 108 are facing each other.

As shown in FIG. 1a, a hub structure to be hoisted (constituted by nacelle 107, hub 108, blades 103-105, hub-blade coupling device, etc.) may be initially formed with the nacelle 107 arranged on a pedestal 113 (or similar) and with the third blade 105 lying on the deck (or ground) level 114. Then, the first crane 100 and the second crane 101 may cooperate to elevate the hub structure (to be hoisted) to a position as the one shown in FIG. 1b, in which height 119 of the root portion 115 and height 120 of the blade portion 117 held by the sling 111 may substantially coincide.

Afterwards, the second (or auxiliary) crane 101 may be operated to lower the third blade 105 at the blade portion 117 (held by the sling 111) in such a way that a difference 121 between height 119' of the root portion 115 and height 120' of the blade portion 117 increases, as shown in FIG. 1c. In alternative examples, the second crane 101 may simply hold up the third blade 105 at the blade portion 117 (held by the sling 111) at a fixed height 120 while the first crane 100 pulls up the hub structure (to be hoisted), such that the same effect (increasing difference 121 of heights) is obtained.

Pulling up of the hub structure (to be hoisted) by the first crane 100 may comprise a horizontal component in such a way that, as shown in FIG. 1c, the hub structure is approached towards the second crane 101. This way, movement of the third blade 105 towards its target vertical arrangement is facilitated.

When the third blade 105 has reached a maximum inclination depending on the configuration of the cranes 100, 101, the third blade 105 may be released from the second crane 101 in such a way that the third blade 105 may move (or fall) by gravity to the pursued vertical position. The hub-blade coupling device may be configured to avoid said fall of the third blade 105.

For example, the hub-blade coupling device may further comprise an auxiliary drive system aimed at controlling the movement of the third blade 105 from the maximum inclination position to the vertical position. This drive system may comprise e.g. one or more cables 112 configured to connect the hub mount structure 109 and the blade mount structure 110, and a cable regulator system configured to control the length of the one or more cables 112. Damages on the blade 105 due to its movement towards the vertical position may be avoided with such a drive system.

Alternatively or additionally to having said auxiliary drive system, the second crane 101 may be configured to drop its cable 106 in a controlled manner when the nacelle 107 and hub 108 are at a certain height. Said dropping of the cable 106 may be performed in such a way that careful movement of the third blade 105 towards its vertical position can be achieved.

Figure 2A:
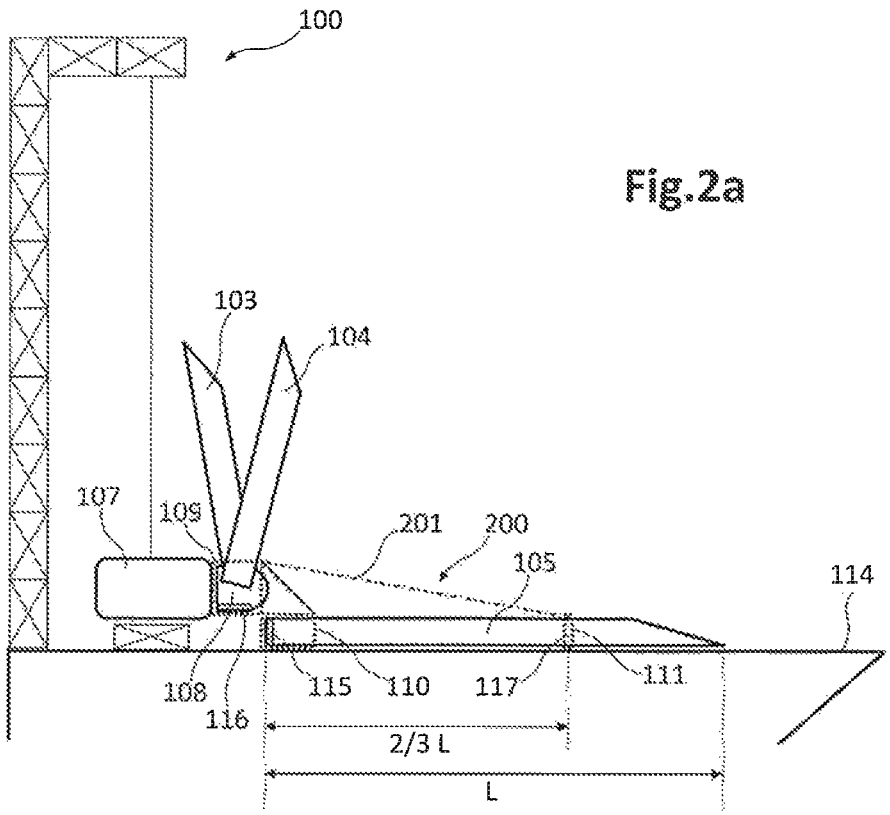
Figure 2B:
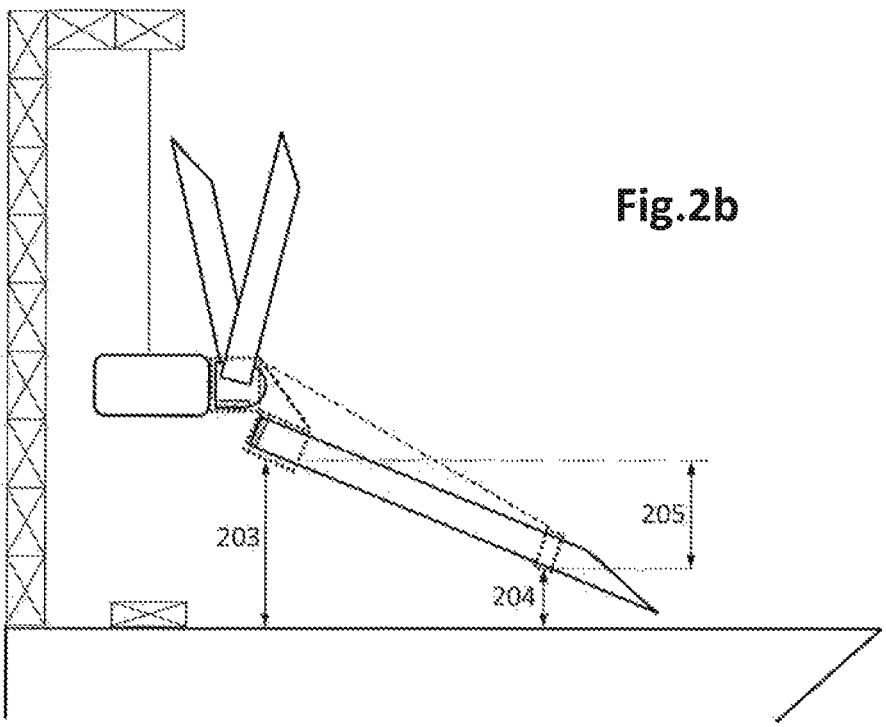

FIGS. 2a-2c show a hoisting system configured to mount a nacelle 107 and hub 108 on top of a tower to form a wind turbine, according to a further example. This hoisting system is similar to the one described before. One difference is that this hoisting system comprises a tensor system 200 instead of a second (or auxiliary) crane 101. This tensor system 200 may comprise a cable 201 with a sling 111 and a cable regulator (not shown).

The cable 201 may be configured to connect in a tensed manner the hub mount structure 109 with a blade portion 117 of the third blade 105 held by the sling 111, such that the third blade 105 is held up at this blade portion 117 by the tensed cable 201. The cable regulator may be configured to extend the tensed cable 201 in such a way that the blade portion 117 (held by the sling 111) is lowered during at least part of or after the pulling up of the nacelle 107 and hub 108.

This lowering of the third blade 105 at the blade portion 117 (held by the sling 111) may cause the pursued additional movement of the third blade 105 towards its vertical position.

FIG. 2a shows a hub structure to be hoisted (constituted by nacelle 107, hub 108, blades 103-105, hub-blade coupling device, etc.) in an initial position equal or similar to the one shown in FIG. 1a, i.e. with the third blade 105 lying on the deck level 114.

FIG. 2b shows said hub structure elevated (by the first crane 100) such that the root portion 115 of the third blade 105 is at a height 203 from deck level 114. The third blade 105 is shown lowered (by the tensor system 200) at the blade portion 117 held by the sling 111 such that this blade portion 117 is at a height 204 from the deck level 114. A difference 205 between height 203 and height 204 is also indicated in FIG. 2b.

FIG. 2c shows the nacelle 107 and hub 108 more elevated than in previous figure, and the third blade 105 more lowered at the blade portion 117 (held by the sling 111) than in previous figure. Therefore, difference 205' between height 203' of the root portion 115 and height 204' of the blade portion 117 held by the sling 111 is shown (in FIG. 2c) larger than difference 205 between height 203 of the root portion 115 and height 204 of this blade portion 117 (in FIG. 2b).

Further transitions as the ones illustrated between FIGS. 2a and 2b and 2c may be performed, by elevating (by the first crane 100) the nacelle 107 and hub 108 and lowering (by the tensor system 200) the third blade 105 at the supporting portion 117 held by the sling 111, until the third blade 105 reaches the target vertical position.

The hoisting system of FIGS. 2a-2c could further comprise a drive system with corresponding cable(s) 112 and cable(s) regulator, such as e.g. the one previously described with reference to FIGS. 1a-1c. This drive system may cooperate with the first crane 100 and tensor system 200 for moving the third blade 105 towards the target vertical position.

The sling 111 may be made of a material with a suitable balance between softness and strength, such as e.g. suitable types of rubber or similar material, or a polymer-based textile. For example, blade support slings made of nylon/polyester may be used for that purpose. This way, the third blade 105 may be held up at a blade portion 117 with the blade 105 suspended in a relatively strong and careful manner at the same time.

In the above examples of FIGS. 1a-2c, in which the third blade 105 is held up by a cable 106, 201 and sling 111, the sling 111 may be positioned at a distance from the root portion 115 of the third blade 105 substantially equal to ⅔ of the length L of the third blade 105.

Alternatively or additionally to having the second crane 101 or the tensor system 200, the blade support may comprise a pivoting support system, such as e.g. the one illustrated in FIGS. 3a-3b. This blade support 308 may comprise a support base 303 configured to be arranged directly on the deck (or ground) level 114 or on a pedestal 301 (or similar) arranged on the deck level 114. This way, the third blade 105 may be supported at a blade portion 117 in a pivoting manner.

This support base 303 may thus be arranged in such a way that pivoting of the third blade 105 on the support base 303 may be caused during at least part of the pulling up of the nacelle 107 and hub 108. In particular, the third blade 105 may pivot on the support base 303 in such a way that the pursued additional movement of the third blade 105 (towards vertical position) is caused.

According to some examples, this pivoting support system 308 may further comprise a support platform 302 pivotally arranged on the support base 303 in such a way that the third blade 105 and the support platform 302 jointly pivot on the support base 303 during at least part of the pulling up of the nacelle 107 and hub 108. Said joint pivoting may occur in such a way that the intended additional movement of the third blade 105 (towards vertical position) is caused.

As shown in FIG. 3a, a hub structure to be hoisted (constituted by nacelle 107, hub 108, blades 103-105, hub-blade coupling device, etc.) may be initially formed with the nacelle 107 arranged on a pedestal 300 (or similar). Pedestals 300 and 301 may be used in order to achieve a balanced hub structure (to be hoisted). The third blade 105 may be arranged with blade portion 117 lying on the support platform 302, so that the third blade 105 is suitably arranged, e.g. substantially parallel to deck (or ground) level 114.

In FIG. 3a, the hub structure (to be mounted on top of the tower) is shown with the third blade 105 arranged lengthwise of the vessel 309.

Once the hub structure (to be hoisted) has been formed, the first crane 100 may initiate the pulling up of the hub structure in such a way that the third blade 105 and the support platform 302 jointly pivot on the support base 303, as shown in FIG. 3b. This joint pivoting may occur in a manner that an increasing difference 305 is caused between height 306 of the root portion 115 and height 307 of the blade portion 117 that is supported on the support platform 302.

The first crane 100 may be configured to pull up the formed hub structure while moving it towards a position substantially on the vertical of the support system 308. This way, the additional movement of the third blade 105 (towards its vertical arrangement) may be performed with the third blade 105 always supported on the support system 308 until the vertical position is achieved. Hence, movement (or fall) by gravity of the third blade 105 may be avoided in this case.

Alternatively or additionally to having the first crane 100 configured to move the nacelle 107 and hub 108 towards a position substantially on the vertical of the support system 308, the hoisting system may further comprise an auxiliary drive system. Said auxiliary drive system may have corresponding cable(s) 112 and cable(s) regulator, such as e.g. the one described with reference to FIGS. 1a-1c, aimed at controlling the movement of the third blade 105 towards its vertical position. Damages on the blade 105 may thus be avoided with this drive system.

Figure 4A:
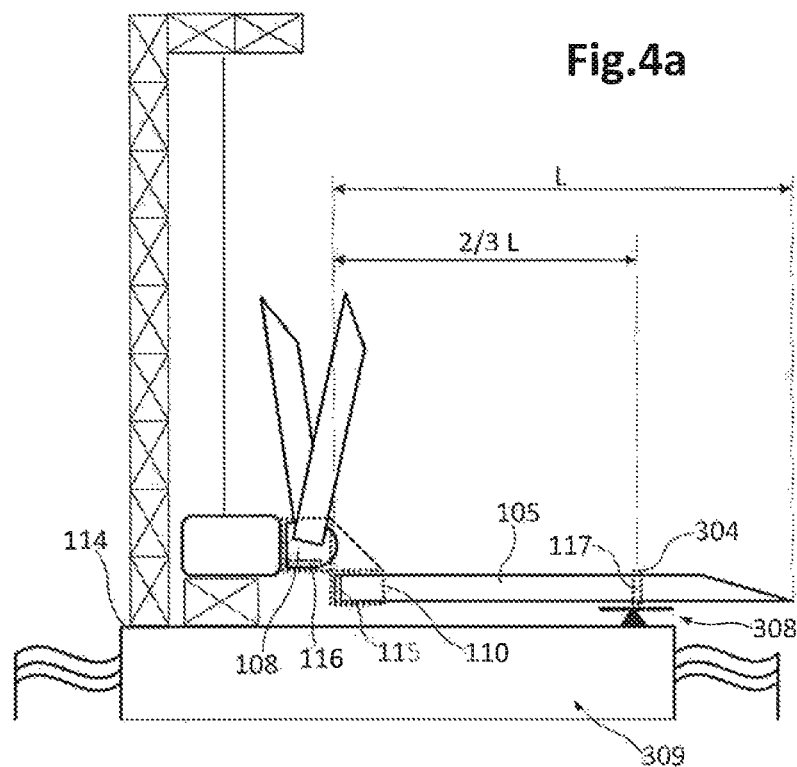
FIGS. 4a-4b schematically illustrate a slight variant of the system and method of FIGS. 3a-3b.
Figure 4B:
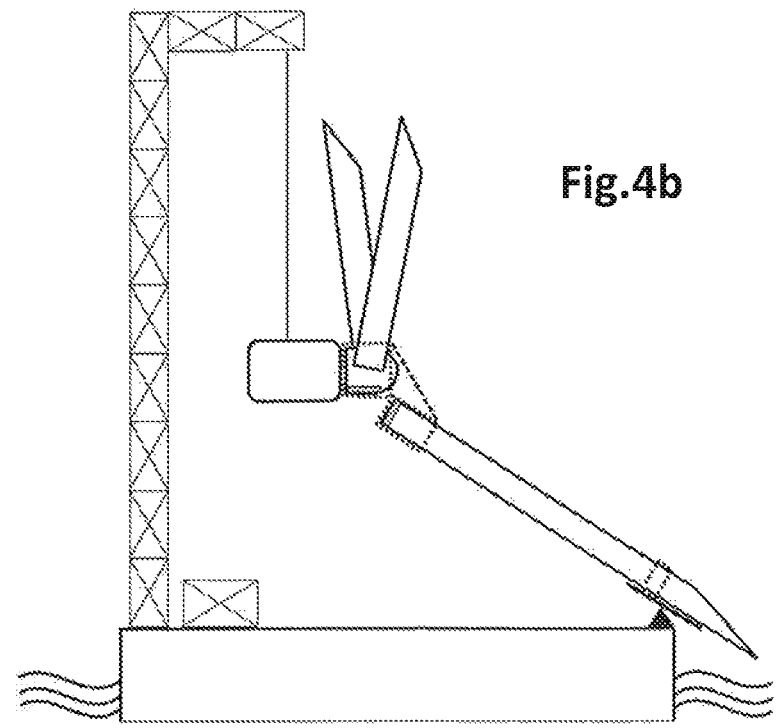

FIGS. 4a-4b show similar views to those of FIGS. 3a-3b. One difference is that the hub structure (to be mounted on top of the tower) is shown in FIGS. 4a-4b arranged on the deck level 114 widthwise of the vessel 309. This widthwise arrangement may permit optimizing the space available on the deck 114, such that a larger amount of hub structures (to be mounted on top of a tower) may be transported on the vessel 309.

Arranging a hub structure (to be mounted on top of the tower) widthwise of the vessel 309 may cause the third blade 105 to overhang the deck 114 as shown in FIGS. 4a-4b. This overhanging of the third blade 105 may permit having a blade support 308 lower than in other configurations in which the third blade 105 does not overhang the deck 114. Therefore, the pedestal 301 (or similar piece) of FIGS. 3a-3b may not be required in this case.

FIG. 5 schematically illustrates a hub structure to be hoisted (constituted by nacelle 107, hub 108, blades 103-105, hub-blade coupling device, etc.) by using a hoisting system according to a still further example. This hoisting system is similar to the ones shown in FIGS. 3a-4b. One difference is that the blade support 308 is sized in such a way that, when the hub structure (to be hoisted) is on deck level 114, the third blade 105 is supported by the blade support 308 with the third blade 105 inclined. This inclination may be such that the blade portion 117 of the third blade 105 that is supported on the blade support 308 is positioned more elevated than the root portion 115 of the third blade 105.

Having the third blade 105 inclined as shown in FIG. 5 may permit optimizing the space on the deck 114, so that larger quantities of hub structures (to be mounted on top of a tower) may be transported on the vessel 309. Another aspect is that negative effects of the surf on the third blade 105 may be avoided or attenuated when the third blade 105 overhangs the deck 114 because e.g. the hub structure (to be hoisted) is arranged widthwise of the vessel 309, as shown in FIGS. 4a-4b.

In any of the previously described examples with reference to FIGS. 3a-5, the hoisting system may further comprise a blade protector 304. The blade protector 304 may be configured to cover the blade portion 117 in such a way that the third blade 105 is supported on the blade support 308 at said blade portion 117 with at least part of the blade protector 304 stuck between the third blade 105 and the blade support 308.

The blade protector 304 may be made of a material with suitable balance between softness and strength, such as e.g. suitable types of rubber or similar material. This way, the third blade 105 may be supported at the blade portion 117 with the blade 105 relatively strongly protected and retained at the same time.

In any of the previous examples of FIGS. 3a-5, the blade portion 117 at which the third blade 105 is supported may extend to a greater or lesser extent at both sides of a blade region which is at a distance from the root portion 115 substantially equal to ⅔ of the length L of the third blade 105.

FIGS. 6a-6d schematically illustrate a hoisting system and a method of mounting a nacelle 107 and hub 108 on top of a tower by using said hoisting system, according to another example. In this case, the blade support may comprise a blade protector member 600, a platform member 601 and a rolling member 602. The blade protector member 600 may be configured to cover at least part of the blade portion 603 at which the third blade 105 is supported.

The platform member 601 may be attached to the blade protector member 600 in such a way that the platform member 601 extends substantially parallel to a longitudinal axis 604 of the third blade 105 at least between the blade protector member 600 and a blade tip of the third blade 105.

The rolling member 602 may be configured in such a way that its rolling is caused along the platform member 601 during at least part of the pulling up of the nacelle 107 and hub 108 (by the first crane 100). The rolling member 602 may thus roll between the deck 114 and the platform member 601 in such a way that the additional movement of the third blade 105 towards its vertical position is caused.

Figure 6A:
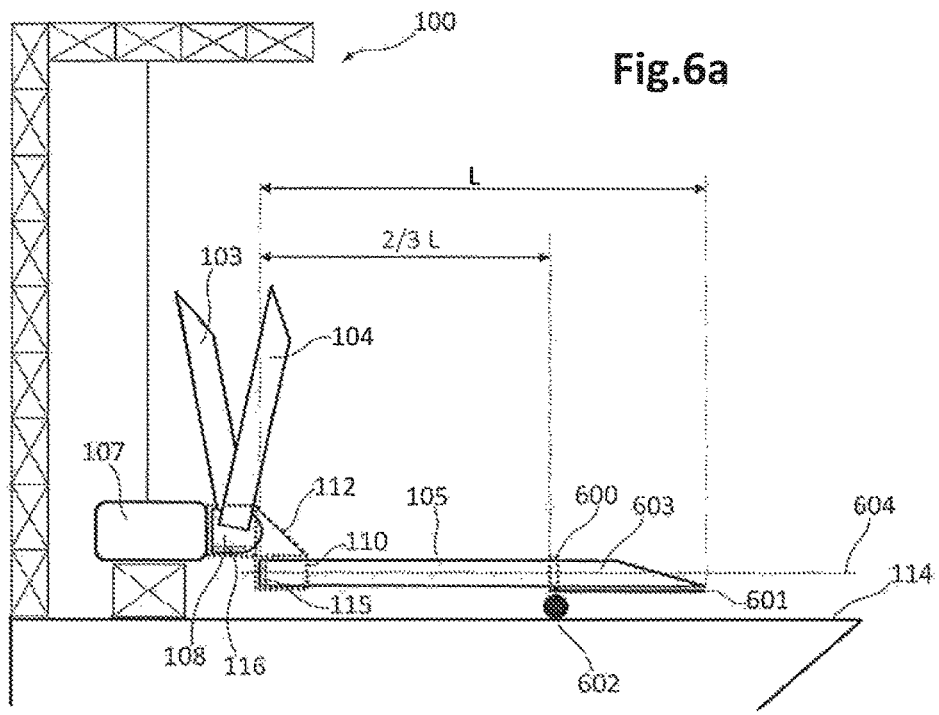

Once a hub structure to be hoisted (constituted by nacelle 107, hub 108, hub-blade coupling device, etc.) has been initially formed as depicted in FIG. 6a, the first crane 100 may initiate the pulling up of the formed hub structure. This pulling up may be performed in such a manner that the rolling member 602 rolls between the deck 114 and the platform member 601 such that a motion sequence as the one illustrated from FIG. 6b to FIG. 6d may be caused.

Figure 6B:
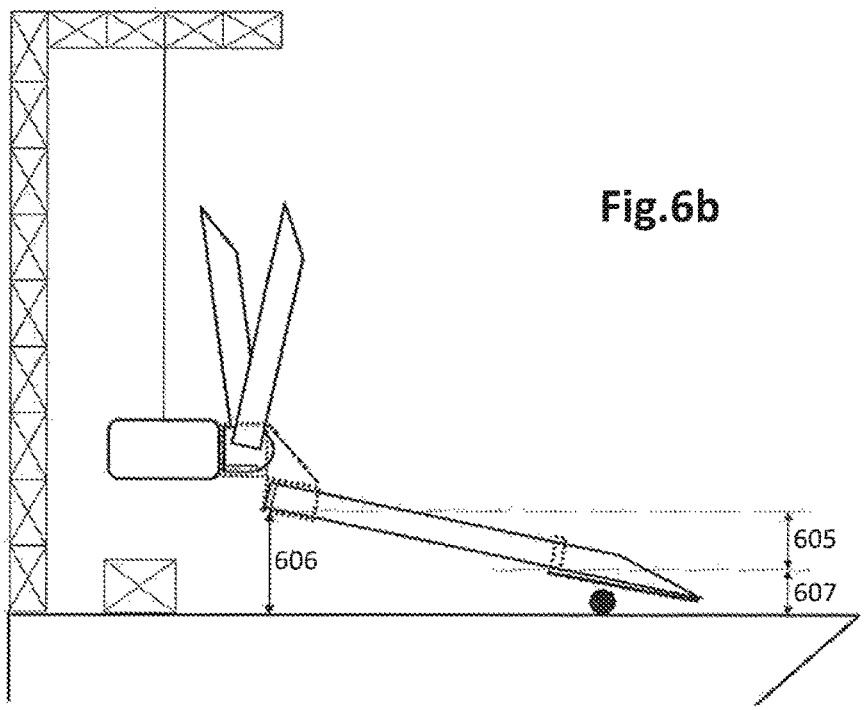

In this motion sequence (from FIG. 6b to FIG. 6d), the rolling of the rolling member 602 may occur in such a manner that an increasing difference 605 between height 606 of the root portion 115 and height 607 of the blade portion 603 is caused. The hoisting system of FIGS. 6a-6d may be configured in such a way that pulling up of the hub structure by the first crane 100 may comprise a horizontal component in such a way that, as shown in FIGS. 6b-6d, the hub structure is hoisted with the third blade 105 always supported on the rolling member 602 until its vertical arrangement is achieved. This way, movement (or fall) by gravity of the third blade 105 may be avoided.

Alternatively or additionally to the above manner of hoisting the formed hub structure with the third blade 105 always supported on the rolling member 602, an auxiliary drive system may be used. This drive system may comprise corresponding cable(s) 112 and cable(s) regulator, such as e.g. the one described in previous figures, aimed at controlling the movement of the third blade 105 towards its vertical position. Damages on the blade 105 may thus be avoided with this drive system, in cooperation or not with the above manner of causing the blade 105 to achieve its vertical position with the blade 105 always supported on the roller member 602.

In the example of FIGS. 6a-6d, the blade portion 603 at which the third blade 105 is supported may extend from ⅔ of the length L of the third blade 105 to at or near the blade tip.

In the previous examples described with reference to FIGS. 1a-6d, the hub 108 is shown initially attached to a nacelle 107 and both (nacelle 107 and hub 108) are pulled up as a single body by the first crane 100 to the top of the tower. In alternative examples, only the hub 108 may be pulled up by the first crane 100 for its coupling with a nacelle which may have been previously mounted on top of the tower.

In any of the previously described examples (of FIGS. 1a-6d), the blade mount structure 110 may comprise a lift system for pulling up the third blade 105 once the third blade 105 has reached the substantially vertical position. This way, coupling of the root portion 115 of the third blade 105 with the coupling portion 116 of the hub 108 may be caused. The lift system may be a telescopic system and/or may be based on one or more hydraulic pistons aimed at that end, for example. In alternative configurations, the lift system may be comprised in the hub mount structure 109. Further alternatively, neither the blade mount structure 110 nor the hub mount structure 109 may comprise such a lift system, in which case an external lift system may be used instead.

Once the coupling of the root portion 115 of the third blade 105 with the coupling portion 116 of the hub 108 has been performed, the root portion 115 of the third blade 105 can be fixed to the coupling portion 116 of the hub 108 by using suitable fastening means, such as e.g. screws, bolts, etc.

Although only a number of examples have been disclosed herein, other alternatives, modifications, uses and/or equivalents thereof are possible. In particular, even though the presently described examples are aimed at offshore applications, the same methods and systems may be used in and on wind turbine mounted on shore as well.

Furthermore, all possible combinations of the described examples are also covered. Thus, the scope of the present disclosure should not be limited by particular examples, but should be determined only by a fair reading of the claims that follow.

The invention claimed is:

1. A hoisting system for mounting a hub on top of a tower in construction of a wind turbine, wherein the hub carries a first blade and a second blade in a bunny ears configuration, and a third blade extending outward and forward from the hub transverse to a longitudinal axis of the first or second blades, the system comprising:
   a first crane configured to pull up the hub from a ground level to the top of the tower;
   a blade support device that engages the third blade at a supported blade portion spaced from a root portion of the third blade;
   a hub-blade coupling device configured between the root portion of the third blade and the hub, the hub-blade coupling device further comprising
   a hub mount structure fixable to the hub;
   a blade mount structure fixable to the third blade at the root portion of the third blade; and
   a hinge mechanism rotatably coupling the hub mount structure and the blade mount structure.

2. The hoisting system according to claim 1, further comprising a second crane configured with a first cable attachable to the blade support device to hold up the third blade at the supported blade portion.

3. The hoisting system according to claim 1, wherein the blade support device further comprises a tensor system, the tensor system comprising a second cable connectable between the hub mount structure and the supported blade portion, and a regulator that controls a length of the second cable.

4. The hoisting system according to claim 1, wherein the blade support device comprises a support base on the ground level at the supported blade portion, the third blade pivotal on the support base upon pulling up of the hub with the first crane.

5. The hoisting system according to claim 4, wherein the blade support further comprises a support platform pivotally configured on the support base to support the third blade at the supported blade portion, the support platform pivotal on the support base upon pulling up of the hub with the first crane.

6. The hoisting system according to claim 4, wherein the support base has a height such that the supported blade portion is above the root portion of the blade in an initial configuration of the hoisting system prior to pulling up the root portion with the first crane.

7. The hoisting system according to claim 1, wherein the blade support device comprises a blade protector, a platform member, and a rolling member, wherein:
- the blade protector is configured to cover a portion of the third blade at the supported blade portion;
- the platform member attachable to the blade protector so as to extend parallel to a longitudinal axis of the third blade; and
- the rolling member disposable between the platform member and the ground level such that pulling up of the hub with the first crane causes the rolling member to roll along the platform member as the root portion of the third blade is raised.

8. The hoisting system according to claim 1, further comprising a drive system configured with a third cable between the hub mount structure and the blade mount structure, the drive system further comprising cable regulator that controls a length of the third cable.

9. The hoisting system according to claim 1, wherein the supported blade portion is at a distance from the root portion corresponding to two-thirds of a length of the third blade.

10. The hoisting system according to claim 1, wherein the hub is attached to a nacelle, the first crane configured to pull up the nacelle and hub as a single structure.

11. The hoisting system according to claim 1, wherein the hub-blade coupling device further comprises a lift system that pulls up the third blade to the hub upon the third blade reaching a vertical position.

12. A method for mounting a hub on top of a tower in construction of a wind turbine with a hoisting system, wherein the carries a first blade and a second blade in a bunny ears configuration, and a third blade extending outward and forward from the hub transverse to a longitudinal axis of the first or second blades, the method comprising:
- fixing a hub mount structure to the hub;
- fixing a blade mount structure to a root portion of the third blade;
- operating a first crane having a first cable attached to the hub mount structure to pull up the hub from ground level to the top of the tower while supporting a supported blade portion of the third blade with a blade support of the hoisting system such that:
  - the first crane and the blade support cooperate to cause a pivoting movement of the third blade relative to the hub during pulling up of the hub such that a height difference is generated between the root portion and the supported blade portion;
  - the pivoting movement of the third blade enabled by a pivotal connection between the hub mount structure and the blade mount structure; and
  - rotation of the third blade is continued until the third blade reaches a vertical position relative to the hub and the root portion of the third blade is facing the hub.

13. The method according to claim 12, further comprising operating the blade support to lower the third blade at the supported blade portion so as to increase movement of the third blade to the vertical position.

14. The method as in claim 13, wherein the blade support is lowered after operation of the first crane is completed.

15. The method as in claim 12, further comprising operating a lift system of the hoisting system to pull up the root portion of the third blade to the hub after the third blade has reached the vertical position, and coupling the root portion of the third blade to the hub.

* * * * *